United States Patent [19]

Dirks et al.

[11] Patent Number: 4,709,363

[45] Date of Patent: Nov. 24, 1987

[54] OPTICALLY READABLE INFORMATION DISC HAVING A REFLECTION LAYER FORMED FROM A METAL ALLOY

[75] Inventors: Albertus G. Dirks, Eindhoven; Hidde H. Brongersma, Waalre, both of Netherlands

[73] Assignee: U.S. Philips Corporation, New York, N.Y.

[21] Appl. No.: 935,148

[22] Filed: Nov. 25, 1986

Related U.S. Application Data

[63] Continuation of Ser. No. 708,362, Mar. 4, 1985, abandoned, Continuation of Ser. No. 364,351, Apr. 1, 1982, abandoned.

[30] Foreign Application Priority Data

Nov. 5, 1981 [NL] Netherlands .......................... 8102283

[51] Int. Cl.$^4$ ................................................. G11B 3/70
[52] U.S. Cl. .................................... 369/275; 369/288; 369/283; 428/65; 430/495
[58] Field of Search .............. 369/275, 283, 285, 286, 369/288; 428/64–65; 430/16, 18, 321, 495; 346/76 L, 135.1

[56] References Cited

U.S. PATENT DOCUMENTS

| | | | |
|---|---|---|---|
| 3,982,066 | 9/1976 | Nyman et al. ................... | 369/283 X |
| 4,091,454 | 5/1978 | Kauffmann ......................... | 360/135 |
| 4,126,726 | 11/1978 | Soeding .......................... | 369/275 X |
| 4,188,433 | 2/1980 | Dijkstra et al. .................. | 369/275 X |
| 4,214,249 | 7/1980 | Kasai et al. ...................... | 346/76 L |
| 4,331,966 | 5/1982 | Moe ..................................... | 346/137 |
| 4,363,844 | 12/1982 | Lewis et al. ................... | 369/285 X |
| 4,404,656 | 9/1983 | Cornet ............................... | 365/126 |
| 4,405,994 | 9/1983 | Cornet et al. ....................... | 365/126 |
| 4,450,553 | 5/1984 | Holster et al. ...................... | 369/275 |

FOREIGN PATENT DOCUMENTS

| | | | |
|---|---|---|---|
| 0014706 | 2/1979 | Japan ................................. | 369/275 |
| 7803069 | 9/1979 | Netherlands ........................ | 369/275 |
| 2017379 | 10/1979 | United Kingdom ................ | 369/275 |

OTHER PUBLICATIONS

The American Heritage Dictionary of the English Language ©1969, p. 153, definition of boron.
Journal of the Optical Society of America, vol. 44, No. 6, Jun. 1954, Bond, "Notes on Solution of Problems in Odd Job Vapor Coatings".

*Primary Examiner*—Aristotelis M. Psitos
*Attorney, Agent, or Firm*—Norman N. Spain

[57] ABSTRACT

An optically readable information disc having a supporting plate which on at least one side has a layer of synthetic resin in which an optically readable structure has been provided which is covered with a layer of a metal alloy which is selected from the group consisting of a Ag-Cu alloy with more than 40 at.% Ag, a Cu-Cr alloy with more than 8 at.% Cr, an Al-Cr alloy with more than 75 at.% Al, an Al-Cu alloy with more than 40 at.% Al, an Al-B alloy with more than 70 at.% Al, an Al-Mn alloy with at least 75 at.% Al and an Al-lanthanide alloy with 0.1 to 3 at.% of the lanthanide.

1 Claim, 2 Drawing Figures

OPTICALLY READABLE INFORMATION DISC HAVING A REFLECTION LAYER FORMED FROM A METAL ALLOY

This is a continuation of Ser. No. 364351 filed Apr. 1, 1982, now abandoned, also application Ser. No. 708,362, filed Mar. 4, 1985, now abandoned.

BACKGROUND OF THE INVENTION

The invention relates to an optically readable information disc which comprises a substrate plate which has on at least one side a layer of a synthetic resin in which a reflecting optical structure has been provided which comprises an information track of information areas situated alternately at a higher level and at a lower level, which areas are covered with a metal reflection layer.

Such a disc is disclosed in Netherlands Patent Application No. 76 11 395 (PHN 8576) filed in the name of the Applicants.

The known disc is constructed from a preferably transparent substrate plate manufactured from a synthetic resin for example in particular polymethylmethacrylate, which plate is provided on at least one side with a layer of lacquer cured by means of radiation, for example, ultraviolet light, in which the information track is present and which is covered with a thin reflection layer of aluminum. A suitable reflection layer is a vapour-deposited aluminum layer having a thickness of 30 nm. The information areas in which audio or video information may be stored, have small dimensions. The difference in height between the areas is approximately 0.1–0.2 $\mu$m. The longitudinal dimensions of the areas which vary in accordance with the stored information are roughly 0.3–3 $\mu$m. The stored information is read in reflection by means of laser light on the basis of phase differences. The laser light is preferably focused on the optical structure via the transparent substrate.

Netherlands Patent Application No. 78 03 069 (PHN 9076) also filed in the name of the Applicants discloses optically readable multi-layer information discs in which partially permeable reflection layers of, for example, Ag, Ni or Al may be used.

From the investigation which led to the present invention it has been found that the reflection layers of Ag or Al used so far show disadvantages. It has been found, for example, that the stability of the thin layers of Ag and Al is not wholly acceptable. In the applicants opinion the internal stress of these metal layers plays a role, and also the too low resistance against chemical attack of these metal layers.

The investigation into the quality of the optically readable discs and in particular into the quality and durability of the reflection layers has been carried out inter alia, by means of a cyclic moisture test, sometimes termed a tropical test. According to this test the discs are stored for a long test period of at least a few weeks in periodically varying climatological conditions. For this purpose the discs were placed in a climate box and were subjected to 24 hours temperature and moisture cycles in which the discs were kept at a temperature of 45° C. for 8 hours at a relative humidity of 70–90% and then at a temperature of 25° C. for a period of 16 hours at a relative humidity of 100%. It has been found that the quality of a reflection layer of Al is very poor after a test period of 3–5 weeks. The reflection layer showed holes having a diameter of 1 $\mu$m or larger. It will be obvious that such holes have a very detrimental influence upon the quality of the, very finely structured stored information. After the above-mentioned test period, the quality of an Ag layer proved to be slightly better as compared with Al, but in itself was still clearly insufficient. It has furthermore been found that an Ag layer adheres insufficiently to the above-mentioned light-cured lacquer layer, in particular a cured layer of an acrylate or methacrylate synthetic resin.

The above-described problems can now be explained at least partly from the fact that the reflection layer provided has a very small thickness of approximately 70 nm. The properties of the metal, in this case Ag or Al, in such a thin layer clearly differ from the properties of the same metals in bulk. For example, the oxidation sensitivity, the sensitivity to attack by contaminations in the atmosphere and the sensitivity to attack by those components of the underlying cured lacquer layer which have not been polymerized during the exposure to light (however small the quantity of such monomers present in the cured lacquer may be) are obviously increased. Furthermore, the expansion of the synthetic resin present below the metal layer as a result of temperature variations (thermal expansion) or as a result of moisture absorption is higher by a factor of 2 to 5 than that of the metal layer. From this the conclusion might be drawn that a metal layer of the above-mentioned small thickness cannot form a really stable reflection layer on a synthetic resin substrate in which stability must be related to the very finely detailed optical structure.

BRIEF SUMMARY OF THE INVENTION

An object of this invention is to provide an optically readable information disc of the type described in the opening paragraph in which a really stable reflector layer is present according to the invention as novel an optically readable information disc of the type mentioned in the opening paragraph is provided which is characterized in that the reflection layer is a metal alloy selected from the group consisting of a Ag-Cu alloy having more than 40 at.% Ag, a Cu-Cr alloy having more than 8 at.% Cr, an Al-Cr alloy having more than 75 at.% Al, an Al-Cu alloy having more than 40 at.% Al, an Al-B alloy having more than 70 at.% Al, an Al-Mn alloy having at least 75 at.% Al and an Al-lanthanide alloy having 0.1 to 3 at.% of the lanthanide.

With the exception of the Al-lanthanide alloy, each of the above-mentioned alloys preferably comprises at least 1 at.% of the composing elements.

DETAILED DESCRIPTION OF THE INVENTION

Figure 1:
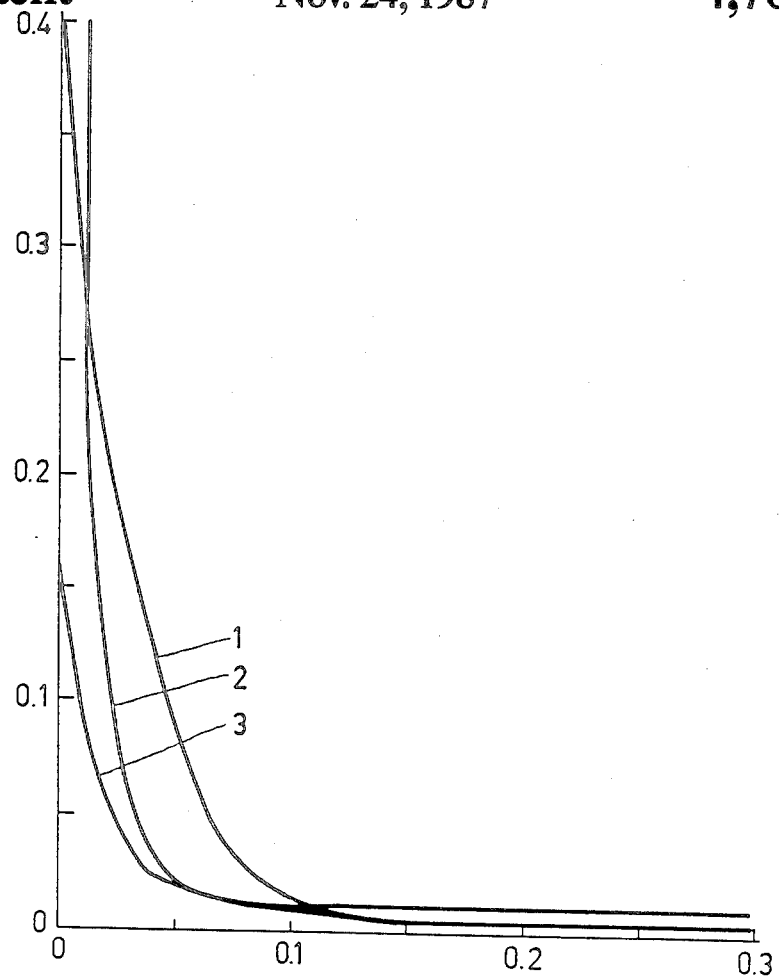
FIG. 1 is a graph showing the crystal size of some metal alloys employed in the invention as a function of the compositions of the alloys.

In contrast with the above-mentioned silver layer or aluminum layer and also in contrast with many other metal alloys examined by the Applicants, the above-mentioned alloys, provided in a thin layer of, for example, 30–300 nm thick on a synthetic resin substratum, in particular a substratum of an acrylate or a methacrylate synthetic resin, show an excellent stability where tested in the above-mentioned cyclic moisture test, as well as a good adhesion and furthermore a sufficiently large light reflection. The adhesion is determined in the so-called diamond scratch test in which twelve scratches are provided in the surface of the metal layer, which scratches extend throughout the thickness of the metal layer. The pattern of scratches comprises 6 parallel scratches with a mutual distance of 1 mm which are crossed at right angles by 6 parallel scratches having a mutual distance of 1 mm so that the pattern of scratches comprises 25 areas of 1 mm$^2$. A strip of adhesive tape (cellutape) is pressed on the said pattern of scratches and is then pulled off from the surface. In the case of a good adhesion of the metal layer, the strip of adhesive tape will bear no material removed from the surface.

Experiments have demonstrated that the crystallite size of a metal alloy as described above is considerably smaller than that of the individual metals of which the alloy is composed. For example, it has been found that the crystallite size of a 50 nm thick layer of $Ag_{92}Cu_8$ is a factor 5–10 smaller than that of pure Ag. Applicants have come to the conclusion that the considerably reduced crystallite size is an important cause of the found improved adhesion of the layer of the metal alloy. It is believed that the increase in volume of interface regions with a high energy level resulting from a reduced crystallite size, is responsible for the formation of higher adhesive forces.

The layer of synthetic resin on which the reflection layer is provided may be a separate layer, i.e. provided separately on the substrate plate, for example, a light-cured acylate layer provided on a substrate manufactured from, for example, glass or from a synthetic resin, for example, polymethylmethacrylate. It is also possible for the layer of synthetic resin to form part of the substrate plate and to be manufactured from the same material as the substrate plate. The substrate plate is then manufactured entirely from a synthetic resin, for example a plate of a cured acrylate lacquer or, for example, a plate of polymethylmethacrylate.

In a favourable embodiment of the information disc according to the invention, a metal alloy is used having a light reflection at 850 nm of at least 70%, selected from the group consisting of a Ag-Cu alloy with more than 40 at.% Ag, a Cu-Cr alloy with a chromium content between 8 and 50 at.%, an Al-Cr alloy with a chromium content smaller than 10 at.%, an Al-Cu alloy with more than 40 at.% of Al, an Al-B alloy with at least 90 at.% Al, an Al-Mn alloy having a manganese content smaller than 10 at.% and an Al-lanthanide alloy having 0.1–3 at.% of the lanthanide.

The high light reflection at 850 nm enables optimum reading of the optical disc by means of an AlGaAs laser which is very suitable for practical purposes and which has an emission wavelength of approximately 850 nm.

In a further favourable embodiment of the disc in accordance with the invention, the Ag-Cu alloy also comprises Al. In such an alloy a smaller amount of Ag will suffice so that cost-saving is possible. It is also achieved that, due to the presence of Al, an oxide skin is formed which gives a better resistance against chemical attack such as oxidation.

The formation of a favourable oxide skin also takes place in alloys comprising Cr or lanthanides such as Y (yttrium), Er (erbium) and Dy (dysprosium).

The reflection layer used in the disc according to the invention can be provided in a high vacuum by means of a vapour deposition process. The layer may also be provided by means of a sputtering process, which is sometimes a bit simpler from a technical point of view.

The invention will now be described in greater detail by means of the figures drawing and the following example in FIG. 1 shows graphically the crystallite size of some metal alloys (y-axis) as a function of the composition of the metal alloys (x-axis).

On the vertical axis in FIG. 1 there is plotted the crystallite size in μm of a 1 μm thick layer of a metal alloy provided as an Si-substrate by means of a high-vacuum vapour-deposition process. The composition of the metal alloy by means of the atomic fraction X is plotted on the horizontal axis. Line 1 relates to the metal alloy $Al_{1-x}B_x$. Line 2 denotes the metal alloy $Cu_{1-x}Cr_x$, and line 3 relates to the alloy $Ag_{1-x}Cu_x$.

EXAMPLES

Figure 2:
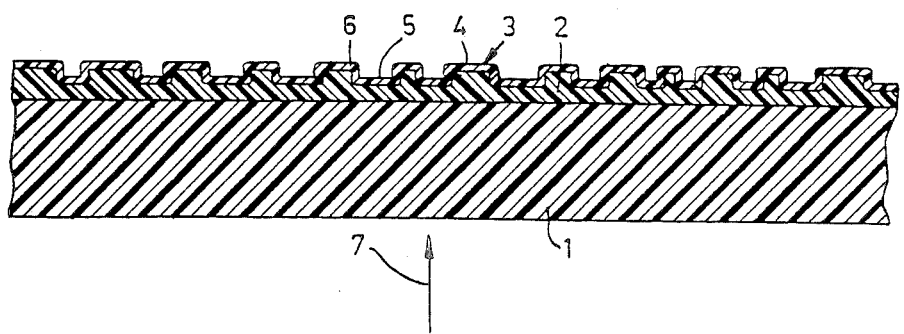
FIG. 2 is a cross-sectional view of an optically readable information disc of the invention.

As shown in FIG. 2, A disc-shaped supporting plate of polymethylmethacrylate 1 having a thickness of 1.2 mm which on one side has a layer of U.V.-light-cured lacquer on the basis of acrylic acid esters 2 having a thickness of 20 μm, was provided on the side of the lacquer layer 2 with a layer of metal, thickness 70 nm, having one of the compositions indicated in column 1 of the Table below. The metal layer was either vapour-deposited in a high vacuum apparatus at a pre-pressure of $10^{-8}$ Torr and an operating pressure of $10^{-7}$ Torr, or was provided while using a magnetron sputtering process performed in an argon atmosphere at an operating pressure of approximately $10^{-3}$ Torr.

The light reflection of the metal layer was measured by focusing light of 630 nm and 850 nm via the supporting plate on the metal layer and determining the amount of reflected light and expressing it as a percentage of the radiated light. The resulting data are recorded in columns 2 and 3 of the following table. The adhesion of the metal layer to the underlying layer of synthetic resin was determined by the above-described diamond scratch test. The results are recorded in column 4 of the table in which the symbols used have the following meanings:

+ = very good adhesion
+/− = sufficient adhesion
− = insufficient adhesion.

The stability of the metal layer was determined in the cyclic moisture test also described above with a duration of the test of 3 weeks. The results are recorded in the last column of the Table in which the symbols used have the following meanings:

+ = good stability; the quality of the metal layer evaluated in a microscopic examination is not reduced or is not visibly reduced after the test.
± = sufficient stability; the metal layer after the test is no longer completely smooth, shows a few very small tears or holes or has partly a slightly duller surface.
− = insufficient stability; the metal layer shows many holes and/or tears.

TABLE

| Composition reflection layer in at. % | | light reflection in % | | Adhesion | Stability |
|---|---|---|---|---|---|
| | | = 630 nm | = 850 nm | | |
| Ag—Cu | | | | | |
| 93 | 7 | 95 | 98 | +/− | + |
| 90 | 10 | 89 | 90 | +/− | + |
| 80 | 20 | 93 | 95 | +/− | + |
| 70 | 30 | 89 | 90 | +/− | + |

TABLE-continued

| Composition reflection layer in at. % | | light reflection in % = 630 nm | = 850 nm | Adhesion | Stability |
|---|---|---|---|---|---|
| 60 | 40 | 88 | 89 | +/− | + |
| Ag—Cu | | | | | |
| 50 | 50 | 87 | 91 | +/− | + |
| 40 | 60 | 92 | 96 | + | − |
| Ag—Cu—Al | | | | | |
| 98 | 1  1 | 95 | 99 | +/− | + |
| 92 | 8  1 | 92 | 95 | +/− | + |
| 90 | 5  5 | 90 | 94 | +/− | + |
| 80 | 10 10 | 89 | 93 | +/− | + |
| Cu—Al | | | | | |
| 50 | 50 | 79 | 86 | + | + |
| 60 | 40 | 84 | 92 | +/− | − |
| Cu—Cr | | | | | |
| 92 | 8 | 73 | not measured | + | − |
| 90 | 10 | 85 | not measured | + | + |
| 70 | 30 | 76 | not measured | + | + |
| 50 | 50 | 70 | not measured | + | + |
| Al—B | | | | | |
| 96 | 4 | 75 | 84 | + | + |
| 94 | 6 | 74 | 83 | + | + |
| 92 | 8 | 73 | 81 | + | + |
| 90 | 10 | 72 | 79 | + | + |
| 80 | 20 | 56 | 59 | + | + |
| 70 | 30 | 44 | 43 | + | − |
| Al—Cr | | | | | |
| 98 | 2 | 87 | 88 | + | + |
| 96 | 4 | 83 | 86 | + | + |
| 94 | 6 | 78 | 81 | + | + |
| Al—Cr | | | | | |
| 92 | 8 | 75 | 78 | + | + |
| 90 | 10 | 68 | 71 | + | + |
| 85 | 15 | 45 | 44 | + | + |
| 80 | 20 | 43 | 44 | + | + |
| 75 | 25 | 42 | 44 | + | − |
| Al—Mn | | | | | |
| 90 | 10 | 60 | 56 | + | + |
| 85 | 15 | 52 | 51 | + | + |
| 80 | 20 | 46 | 46 | + | + |
| 75 | 25 | 44 | 44 | + | + |
| Al—Dy | | | | | |
| 99.5 | 0.5 | 79 | 82 | + | +/− |
| 99.0 | 1.0 | 79 | 81 | + | +/− |
| Al—Er | | | | | |
| 99.5 | 0.5 | 79 | 82 | + | +/− |
| 99.0 | 1.0 | 79 | 81 | + | +/− |
| Ag | | 95 | 95 | − | − |
| Al | | 90 | 90 | + | − |

A cross sectional view of an optically readable information disc of the invention is shown in FIG. 2 of the drawing.

In this figure 1 is a disc shaped supporting place of PMMA having a thickness of about 1.2 mm, provided on one side with a layer 2 of U.V. liquid cured lacquer of acrylic acid esters having a thickness of 20 μm. An information track 3 comprising areas 4 situated at a higher level and areas 5 situated at a lower level is present on the surface of the layer 2 of U.V. liquid cured lacquer. A layer 6 of an alloy of the invention of a thickness of 70 nm is present on the exposed surface of the information track 3.

The information in the information track 3 is readable by means of a beam of light produced by read out laser 7.

What is claimed is:

1. An optically readable information disc comprising a substrate plate upon at least one side of which substrate plate a layer of a synthetic resin provided with a reflecting optical structure is present, said reflecting optical structure comprising an information track of information areas situated alternately at a higher level and at a lower level of said layer of synthetic resin, which areas are covered with a reflection layer of metal adhering to said areas, characterized in that the reflection layer is a layer of an essentially regular thickness of a Ag-Cu-Al alloy at least 40 at.% Ag, at least 1 at.% of Cu and of Al being present.

* * * * *